(12) United States Patent
Lind

(10) Patent No.: US 7,155,825 B2
(45) Date of Patent: Jan. 2, 2007

(54) METHOD OF LIQUID WITHDRAWAL FROM A TOOL SPINDLE

(75) Inventor: Björn Lind, Billdal (SE)

(73) Assignee: Lind Finance & Development AB, Gothenburg (SE)

( * ) Notice: Subject to any disclaimer, the term of this patent is extended or adjusted under 35 U.S.C. 154(b) by 524 days.

(21) Appl. No.: 10/466,195

(22) PCT Filed: Sep. 27, 2001

(86) PCT No.: PCT/SE01/02081

§ 371 (c)(1),
(2), (4) Date: Jan. 16, 2004

(87) PCT Pub. No.: WO02/058867

PCT Pub. Date: Aug. 1, 2002

(65) Prior Publication Data

US 2004/0112678 A1   Jun. 17, 2004

(30) Foreign Application Priority Data

Jan. 23, 2001  (SE) .................................. 0100183

(51) Int. Cl.
*B23B 19/02* (2006.01)
*F16N 9/00* (2006.01)
*F16C 35/00* (2006.01)
*B23C 9/00* (2006.01)

(52) U.S. Cl. .................. 29/898.02; 29/898.1; 409/135; 184/54; 184/55.1; 384/100

(58) Field of Classification Search ............. 29/898.02, 29/898.1; 409/135; 184/54, 55.1, 55.2, 184/50.1; 384/100
See application file for complete search history.

(56) References Cited

U.S. PATENT DOCUMENTS

| 3,432,213 | A | * | 3/1969 | Adams ........................ 384/12 |
| 3,650,582 | A | | 3/1972 | Casey |
| 3,929,393 | A | | 12/1975 | Marantette et al. |
| 6,413,025 | B1 | * | 7/2002 | Lind .......................... 409/134 |
| 6,413,026 | B1 | * | 7/2002 | Lind .......................... 409/135 |
| 6,568,886 | B1 | * | 5/2003 | Lind .......................... 409/136 |

FOREIGN PATENT DOCUMENTS

| DE | 2642584 A | * | 3/1978 |
| EP | 294547 A1 | * | 12/1988 |
| EP | 0 779 127 | | 6/1997 |
| EP | 1 080 829 | | 3/2001 |

* cited by examiner

*Primary Examiner*—Jermie E. Cozart
(74) *Attorney, Agent, or Firm*—Renner, Otto, Boisselle &Sklar, LLP

(57) ABSTRACT

A method for withdrawing liquid from the liquid bearings of a spindle (1) carried in liquid bearings (3, 5) distinguished in that with the help of pressurized gas, the liquid, together with the gas, is forced to exit the spindle during the operation of the spindle via at least one first channel (12), and that when the spindle is shut down, is forced to exit via at least one second channel (13) with a smaller flow-through cross-section than the first channel.

4 Claims, 1 Drawing Sheet

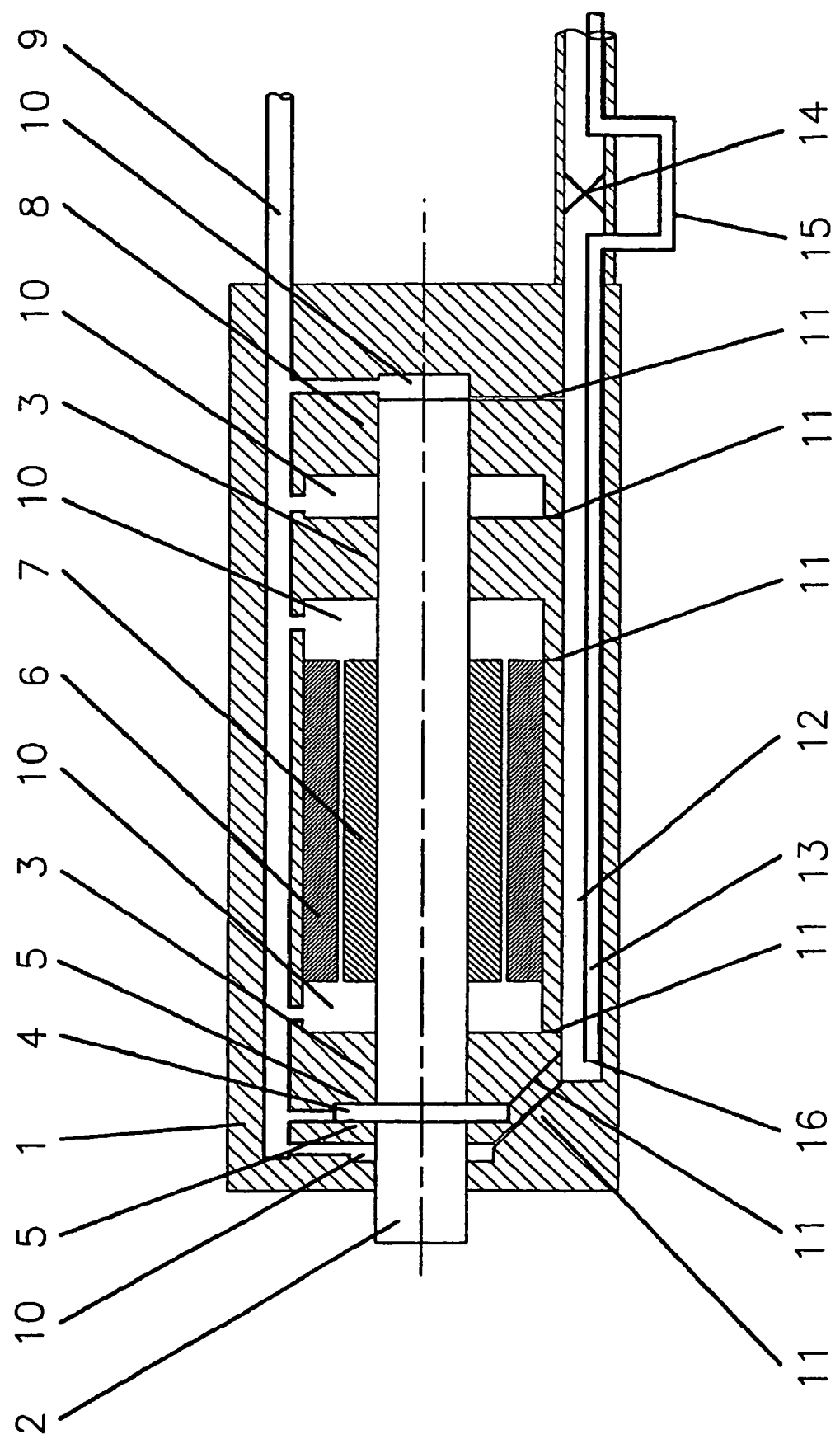

METHOD OF LIQUID WITHDRAWAL FROM A TOOL SPINDLE

This application is a national phase of International Application No. PCT/SE01/02081 filed Sep. 27, 2001 and published in the English language.

The present invention relates to a method of withdrawing liquid from the liquid bearing and cooling system of a spindle carried in liquid bearings.

When using a liquid bearing, i.e. a bearing in which the play between the fixed and the rotating parts is occupied by a continuous supply of liquid, for example water, there normally exists a need to limit in a controlled way the spread of the liquid in the spindle. During the operation of the spindle, liquid under pressure is thus supplied to the said play, which means that the liquid will leak out from both sides of the bearing. With the help of pressurised gas from a source of pressurised air, for example air, so-called blocking gas, the spreading of the liquid can be controlled and continuously removed from the spindle. In this context, reference is made, for example, to the Swedish application 9901053-0 that discusses a tool spindle. Cooling liquid can also be supplied to the spindle.

During the operation of the spindle, there thus exists an essentially constant and continuous state with an effective bearing function and, whenever applicable, cooling. The present invention relates to a completely new method of withdrawing liquid from the spindle with the help of blocking gas. The total flow of gas and liquid is naturally determined by the size and number of bearings as well as the cooling need, and thus requires one or more withdrawal channels with a sufficient cross-sectional flow.

When the spindle is shut down and the flow of liquid stopped, there is a desire to completely empty the spindle of remaining liquid. As the exhausting channel normally extends up to a higher level than the actual spindle, the spindle cannot be emptied by the forces of gravity when collecting the liquid.

According to the invention, emptying takes place with the help of the pressurised blocking air. The flow cross-section of the withdrawal channel is adapted for operating conditions with a large flow volume (liquid and gas). The significantly reduced flow of a shut-down tool, i.e. the gas flow with remaining liquid, means that the rate of flow in the exhausting channel becomes low with an equivalent low pressure, which leads to an insufficient capacity for emptying. However, by arranging a special withdrawal channel with a flow cross-section, less than that of the first named channel, to be used with a shut-down spindle at the same time as the first named channel is closed off, a sufficient rate of flow is obtained, which leads to that practically complete emptying of the liquid is achieved. The gas/liquid mixture intended for withdrawal is collected in an area located lower down in relation to the orientation of the spindle in space.

The effective removal of liquid from a liquid-borne spindle is achieved with the help of the invention, as is evident from the characterising sections of the claims.

The invention will be described in more detail in the form of examples with reference to the drawing that shows schematically a longitudinal cross-section of a spindle equipped with features that solve the practical aspects of the invention.

1 designates the stationary part of the spindle shown as an example, i.e. the part that is firmly attached in the machine of which the spindle forms a part. This stationary unit 1 has a spindle axle 2 that is supported so that it can rotate, partly by two radially acting liquid bearings 3 and partly by a double-acting axial liquid bearing 5 that acts on both sides of the flange-like part 4 of the spindle and where one forms part of the left radial bearing as seen in the figure. Here, the term liquid bearing refers to a bearing with a static function or dynamic function or a combination of these liquid bearing principles. The spindle axle 2 is driven by an electric motor whose stator is designated with 6 and rotor with 7.

The liquid for the liquid bearings 3 and 5, and for the cooling system of the spindle, is supplied to the spindle via channels that are not shown here but where reference is instead made to that previously known via the previously named Swedish patent 9901053-0. Area 8 is an area that is used for transferring media from the stationary part to the rotatable spindle axle 2.

Gas, for example air from a pressurised source (not shown), is supplied to the spindle via one (or more) supply channels 9 from where the pressurised gas is led to the liquid space 10 in which the bearing and cooling liquid are collected under the shaft of the spindle. An outlet 11 leads from the liquid space 10 to a removal channel 12 to lead away the pressurised gas together with the bearing and cooling liquid during the normal operation of the spindle. To retain the pressure in the bearing and cooling area, the said outlet 11 has a significantly smaller flow-through area than the inlet (here not designated with a reference number) from the supply channel 9.

The removal channel 12 has a flow-through cross-section adapted for leading away liquid and gas supplied to the spindle during its operation. The flow of gas adapted to the operation, and thus the gas pressure for leading away the liquid from the spindle through the removal channel 12, becomes insufficient when the spindle is shut down and the flow of liquid supplied to the spindle significantly decreases and ceases. The pressure and thus the rate of flow of the gas are therefore insufficient to force the remaining liquid that has collected in the lower part of the spindle out through channel 12. To establish a rate of gas flow able to empty the spindle of liquid, a second removal channel 13 is therefore arranged with a significantly smaller flow-through cross-section that is adapted for this purpose. In the figure, this second channel 13 is shown running inside the first channel 12. When the spindle is shut down, the first channel 12 is closed off with the help of a valve 14 so that the total flow is led through the second channel 13. As the channel 13 is built inside the first channel 12, the second channel is shown shunted (at 15) when passing the valve 14. The inlet 16 of the second channel 13 in the spindle should be positioned essentially in the lowest located area of the spindle in order to be thus able to empty the spindle of, in practical terms, all liquid.

It should be pointed out that the second channel 13 need not be located within the first channel 12, which in turn need not necessarily have its inlet located at the lowest located area of the spindle. One or more first and second channels can occur within the spindle.

The invention claimed is:

1. Method for withdrawing liquid from the liquid bearings of a spindle (1) carried in liquid bearings (3, 5) characterised in that with the help of pressurised gas, the liquid, together with the gas, is forced to exit the spindle during the operation of the spindle via at least one first channel (12) and, when the spindle is shut down, is forced to exit via at least one second channel (13) with a smaller flow-through cross-section than the first channel.

2. Method according to claim 1 characterised in that with the help of the pressurised gas, the liquid is forced into an area located down in a lower part in relation to the orientation of the spindle in space within which the inlet (16) for the second channel (13) is located, and that during shut-down of the spindle, the first channel (12) is closed off by means of a closure valve (14).

3. Method according to claim 1 characterised in that the second channel (13) is wholly or partly accommodated in the first channel (12).

4. Method according to claim 1 characterised in that air is used as the gas.

* * * * *